Figure 1:
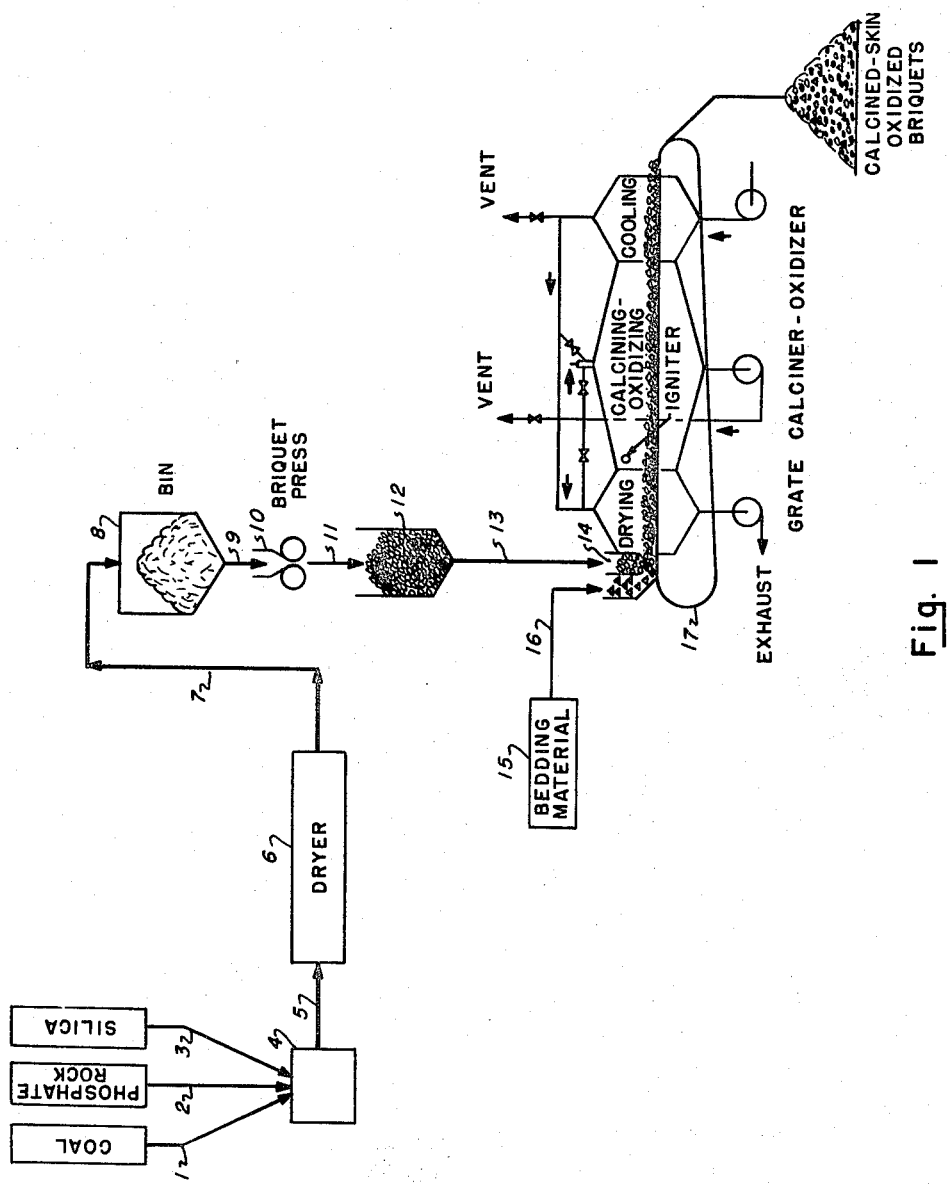

Aug. 8, 1967  W. J. DARBY  3,335,094
AGGLOMERATED CARBONACEOUS PHOSPHATE FURNACE CHARGE
OF HIGH ELECTRICAL RESISTANCE
Filed July 18, 1963  2 Sheets-Sheet 1

Wilbur J. Darby INVENTOR.
BY Robert C. Petrusek
Agent

United States Patent Office 3,335,094
Patented Aug. 8, 1967

3,335,094
AGGLOMERATED CARBONACEOUS PHOSPHATE FURNACE CHARGE OF HIGH ELECTRICAL RESISTANCE
Wilbur J. Darby, Florence, Ala., assignor to Tennessee Valley Authority, a corporation of the United States of America
Filed July 18, 1963, Ser. No. 296,139
6 Claims. (Cl. 252—188.3)

The invention herein described may be manufactured and used by or for the Government for governmental purposes without payment to me of any royalty thereon.

My invention relates to a method of briquetting a mixture of phosphate-bearing rock, reducing agent, and associated fluxing material, and more particularly to a method of preparing agglomerates that contain phosphate rock, carbon, and silica, said agglomerates having high electrical resistance, a characteristic highly desirable in charge material designed for use in electric furnace processing for winning elemental phosphorus from ore.

Heretofore it has been the practice in the chemical industry to produce elemental phosphorus from phosphate rock by reducing the phosphate rock with coke or other carbonaceous reducing agents in the presence of silica. Elemental phosphorus was first produced in a small scale retort by heating bones with charcoal. A process for producing phosphorus by the electric furnace method was patented in 1889. Phosphorus production by the blast furnace method was carried out to a limited extent. Phosphate rock, silica, and coke for heating and for reduction was charged to the blast furnace. The phosphorus vapor was diluted by the large volume of combustion gases and phosphorus recovery was difficult. Phosphorus production by the electric furnace method was universally adopted as the cost of electric power decreased. A charge of phosphate rock, silica, and carbon is heated in an electric furnace of the submerged arc type. The phosphorus, together with the carbon monoxide simultaneously produced by reduction, is taken overhead and the slag residue in liquid phase is tapped out of the base of the furnace.

In preparing the furnace charge, the phosphate is usually agglomerated by nodulizing, pelletizing, or briquetting, and further, the phosphate pellets or briquets are usually calcined before charging to the furnace.

The coke constituent of the charge of the furnace supplies carbon to reduce the phosphate and in some installations half of the carbon required is fed as coke and half as low volatile bituminous coal to enhance the economics of the operation. These furnace-charge materials are quite dissimilar in numerous characteristics and serious segregation of these materials occurs during storage, handling, and feeding into the furnace. Phosphate nodules have a very rough surface and the bulk density is about 56 pounds per cubic foot whereas the coke, which also has a rough surface, has a bulk density of only about 33 pounds per cubic foot. The silica rock has a smooth surface with sharp edges and the bulk density is usually about 95 pounds per cubic foot.

The chemical industry has recognized that the segregation of the furnace-charge components is a major problem in the operation of electric-type phosphorus furnaces. Segregation of the charged material causes excesses and deficiencies of carbon inside the furnace; consequently, the electrode movement is erratic at times, the power load varies widely, and pressure fluctuations are much greater than they are with nonsegregating furnace charge.

Heretofore the problem of charge segregation was generally attacked by control of the size of the charge components so that segregation was minimized. At some industrial plants the phosphate ore and coke are closely sized in order to minimize charge segregation. The closely sized materials apparently give somewhat improved furnace operation and considerable benefit is obtained therefrom.

The benefits derived from a nonsegregating charge can be closely associated with the greater benefits attainable from more intimate contact between phosphate, carbon, and silica. Whereas, point-to-point contact of uniformly distributed loose charge components may satisfy nonsegregation requirements the intimate contact of reactants on a surface-to-surface basis would yield greater benefits in the form of a higher rate of reaction. The association of particles on an extensive surface-to-surface basis promotes an increase in reaction rate proportional to the increase in surface to weight ratio. Attainment of extensive surface-to-surface contact may be substantially realized by compacting the component particles into relatively dense agglomerates in which the semiplastic properties of particles result in deformation and flow into voids originally present. Thus the problem of component segregation and that of attaining greater particle contact area would be solved by agglomeration.

In my early work on this problem of charge segregation, I used the approach of agglomerating a mixture of phosphate rock, coke (or coal) and silica so that these materials would remain in intimate contact during the subsequent smelting operation. I developed the process for the preparation of briquets from calcined phosphate rock, coke, and silica. In this earlier work I used a pitch binder in preparing the briquets. Test on these materials made in electric furnace with briquets which had been carbonized and also with briquets which were not carbonized proved to be quite unsatisfactory in that the electrodes would not adequately penetrate the charge and it was not possible to generate enough heat in the bottom of the furnace. In addition, in the operation of the furnace, the slag was extremely difficult to tap apparently due to insufficient temperatures in the bottom of the furnace.

I have attributed this unsatisfactory operation of the furnace with the briquet charge to the flow of the electric current through the upper part of the charge in the furnace. My investigations during this early work indicated that the electrical resistance of the carbonized briquets gave values of less than about 100 ohms per centimeter cubed, whereas the resistance of a normal furnace charge mixture is about 160 million ohms per centimeter cubed. Although the uncarbonized briquets having the resistance in the range of about 160 million ohms per centimeter cubed obviously have a much higher electrical resistance than the carbonized briquets prepared in my earlier work, I have found that such uncarbonized briquets become carbonized inside the furnace as the charge descends therein with a resulting decrease in the charge resistance. Furthermore, microscopic examination of the resulting carbonized briquets showed a network of carbon throughout the briquet and I have determined that this carbon network permitted the electric current to flow through the material which resulted in a lowering of the charge resistance as it descended through the furnace. In this earlier work I also prepared a briquetted mixture of calcined phosphate rock, coke, and silica, and used cornstarch as a binder instead of pitch. These calcined briquets had a high electrical resistance upwards to about 100 million ohms across an individual briquet with the result that ample heat was generated in the smelting zone of the furnace when these particular briquets were used and the slag was readily tapped. However, the relatively high cost of cornstarch precludes its use in the routine preparation of furnace charge for phosphorus production.

The results of this testing, however, did illustrate the necessity of using a charge of high electrical resistance for operation in an electric furnace.

My invention is directed to a method of producing a briquetted mixture of phosphate, coal, and silica suitable for charge in an electric furnace for winning elemental phosphorus therefrom. I have overcome the disadvantages inherent in the methods of winning the phosphorus from oxygenated ores containing the same by subjecting a briquetted charge of phosphate, coal, and silica in an electric furnace to a substantial extent in the present invention by means of forming briquets containing an intimate mixture of calcined phosphate, coke, and silica, which briquets are provided with an outer layer having exceedingly high electrical resistance. The briquets formed by my process have been found to be exceedingly adaptable for use in phosphorus electric furnaces in that the resistance across single briquets has been found to range upwards to as much as a billion ohms. The resistivity of the briquets may be varied over a considerable range by controlling the depth to which the carbon is burned out in the outer layer of the briquets.

My process for the preparation of these briquets in one form thereof consists of forming an intimate mixture of uncalcined phosphate rock, coal, and silica, and binding said mixture with the clay associated with the phosphate rock so as to preclude the necessity of using pitch or cornstarch. The briquets thus formed are then heated at a temperature below the phosphate reduction temperature (about 1900° F.) in such a manner that an electrically insulating layer is formed around the briquets. During the heating step the coal within the briquet is carbonized to form an intimate mixture of calcined phosphate rock, coke, and silica, and the coal near the outer surface of the briquet is burned away to a depth of approximately one-sixteenth of an inch resulting in an outer layer of calcined phosphate and silica which results in the above-mentioned outer layer of high electrical resistance. Furthermore, several new and advantageous features over the conventional process for the production of phosphorus electric furnace charge are realized by the present invention.

Among these advantageous features are: a process which permits the use of low-cost coal as a source of carbon in the phosphorus furnace charge, which carbon source is less than about half the cost of carbon realized in either metallurgical coke or low-volatile bituminous coal presently used by the industry in electric furnace charges; a high electrical resistance agglomerate which prevents electrical short circuiting in the charge bed as compared with similar agglomerates which do not have electrically insulating outer layers, an agglomerated charge of higher specific resistance than the specific resistance of charge mixtures regularly used in phosphorus furnaces, which results in easier electrode penetration of the charge. In addition, in my process the use of the low-cost coal in the agglomerate mixture supplies heat for the calcining operation thereby providing a more economical fuel source. The agglomerated briquet formed by my process does not require the use of added binders and said briquets have been found to be an intimate reacting mixture throughout the agglomerate, which provides a charge of uniform composition with uniform electrical properties resulting in a furnace power load having very few fluctuations, thereby greatly reducing the erratic movements of the electrodes.

An additional advantage is a process for varying and controlling the electrical resistance of the briquets so that the temperature distribution in an electric type phosphorus furnace may be controlled. This control in temperature distribution in the furnace is accomplished by regulating the depth to which the carbon is burned out in and near the briquet surface so that the electrical resistance may be varied within wide limits. Low resistance briquets tend to cause higher temperature in the upper part of the furnace while high resistance briquets result in a higher temperature in the lower part of the furnace.

It is therefore an object of the present invention to provide a process for the production of briquetted agglomerates of phosphate rock, carbon, and silica of high electrical resistance for use in electric phosphorus furnaces.

A further object of the present invention is to provide a process for the production of briquetted agglomerates of phosphate rock, carbon, and silica of high electrical resistance for use in electric phosphorus furnaces, wherein said agglomerate of phosphate rock, carbon, and silica within the briquet is homogeneous throughout so as to provide a charge material of uniform chemical reacting characteristics.

A still further object of the present invention is to provide a process for the production of briquetted agglomerates of phosphate rock, carbon, and silica of high electrical resistance for use in electric phosphorus furnaces wherein said agglomerate of phosphate rock, carbon, and silica within the briquet is homogeneous throughout so as to provide a charge material of uniform chemical reacting characteristics, which briquets are provided with a thin outer layer of high electrical resistance.

Still further and more general objects and advantages of the present invention will appear from the more detailed description set forth below, it being understood, however, that this more detailed description is given by way of illustration and explanation only and not by way of limitation, since various charges therein may be made by those skilled in the art without departing from the spirit and scope of the present invention.

Therefore, my invention, together with still further objects and advantages thereof, will be better understood from a consideration of the following description taken in connection with the accompanying drawings in which FIGURE 1 is a flow diagram generally illustrating the principles of my process which results in a briquetted agglomerate charge suitable for use in an electric type phosphorus furnace operation and which briquets have the novel properties mentioned above.

Figure 2:
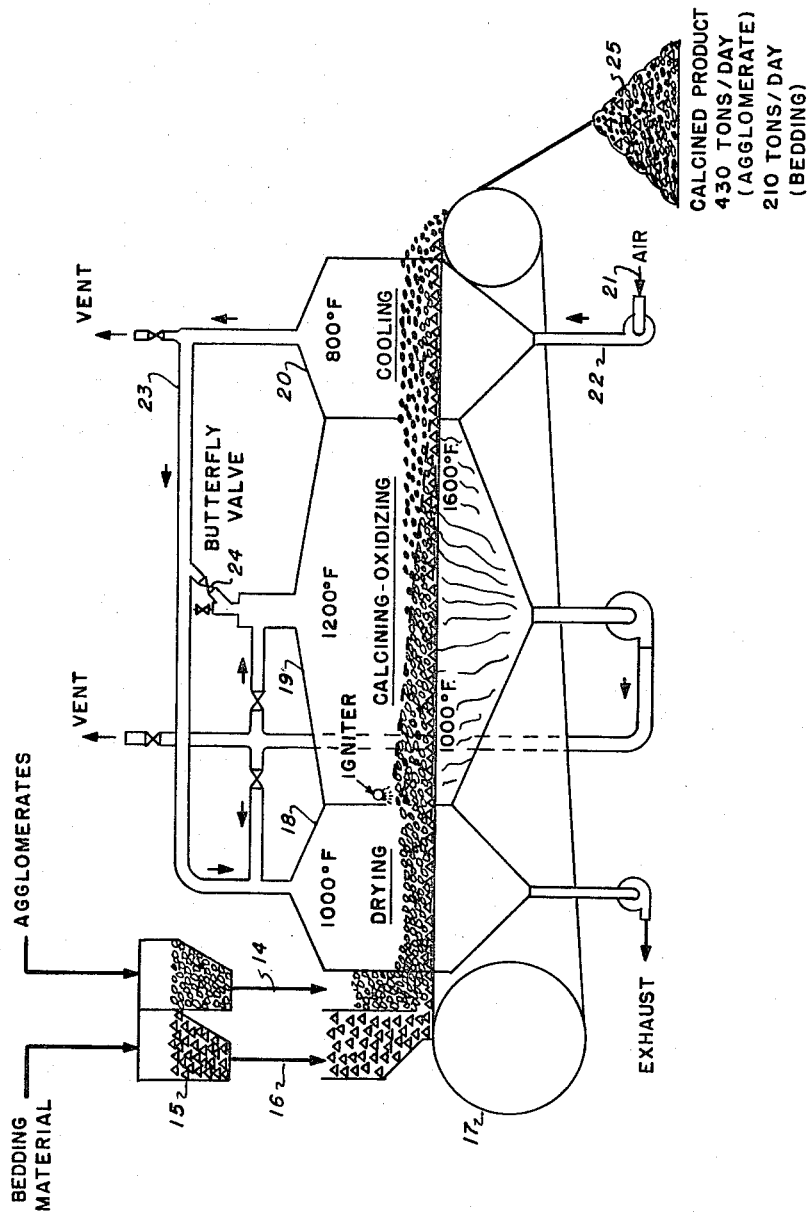

FIGURE 2 is a diagram of the calcining-oxidizing unit utilized in my process.

Referring now more particularly to FIGURE 1, coal, phosphate rock, and silica from sources not shown are led via lines 1, 2, and 3, respectively, into blending means 4. If desired, the materials fed via lines 1, 2, and 3 may be ground to pass a 10-mesh screen prior to introduction into blending means 4. After the material is blended, it is fed from means 4 via line 5 into dryer 6, wherein the moisture content of the blend is reduced from about 22 percent water to about 12 to 14 percent water, said water content being originally supplied from the phosphate rock. The dried material is led from dryer 6 via line 7 into bin 8 and subsequently by means of line 9 into briquetting press generally illustrated at 10. The fresh or green briquets may be dried and led via line 11 into green briquet storage means 12. The green briquets are led from storage 12 via line 13 into hopper 14. Simultaneously, bedding material, which may be screened out rock or recycled calcined product, from source 15 is fed via line 16 onto calcining grate 17 such that the briquets from bin 14 do not come in direct contact with the endless grate, but rather are supported on the bedding material from source 15 in their subsequent travel through the calcining-oxidizing unit.

Referring now more particularly to FIGURE 2, there is shown in greater detail the calcining-oxidizing unit wherein the bedding material from source generally illustrated at 15 is fed via line 16 onto calcining grate 17. The agglomerates or green briquets are fed via hopper 14 on top of the bedding material prior to their travel to the calcining-oxidizing unit. The calcining-oxidizing unit consists generally of three compartments: the drying compartment 18, the calcining-oxidizing compartment 19, and the cooling compartment 20. Air from a source not shown is fed via line 21 through pump 22 up through the calcining grate, the bedding material and the briquets to effect the cooling of same in chamber 20. The resulting heated air from chamber 20 is fed via line 23 into drying chamber 18 whereby the latent heat thereof is substantially recovered by raising the temperature of the briquets in this portion of the unit up to about 1000° F. to effect further drying thereof. The dried briquets traveling on calcining grate 17 subsequently are introduced ino calcining-oxidizing chamber 19, along with some bleed-off air from line 23 by means of valve 24. It is in chamber 19 wherein the briquets are calcined at a temperature upwards of about 1600° F. In chamber 19 the briquets are partially oxidized so that the carbon on and near the surface of the briquets is burned out to form an electrically insulating layer. The calcined briquets then travel into cooling chamber 20 wherein the fresh air from line 21 and pump 22 cools the briquets and at the same time completes the burn-off of the carbon in the outer or skin layer of said briquets rendering them highly electrically resistant. The partially cooled briquets are then collected as product at 25.

In order that those skilled in the art may better understand how the present invention can be practiced, the following examples of processes which I have used in the steps of producing the homogeneous carbon-silica-phosphate rock briquets having an outer layer of unusually high electrical resistivity are given by way of illustration and not by way of limitation.

*Example I*

Phosphate, coal, and silica rock each were ground to pass a 10-mesh screen and mixed. The phosphate was from the TVA Harris tract in Maury County, Tennessee, and it contained 1 percent moisture, 26 percent $P_2O_5$, 20 percent $SiO_2$ and 36 percent CaO. Proximate analysis of the coal gave 2 percent moisture, 33 percent volatile matter, 56 percent fixed carbon, and 9 percent ash. The silica contained 4 percent moisture and 95 percent $SiO_2$. The mixture of these materials comprised 50 pounds of phosphate, 14.5 pounds of coal, 7.0 pounds of silica, and 23.4 pounds of water was added. The $SiO_2$:CaO weight ratio of the mixture was 0.90 and the amount of coal used was ample to supply carbon for reduction of the phosphate. These materials were mixed in an edge-runner type of mixer for 30 minutes. This mixer had a pan 24 inches in diameter and one roller 10 inches in diameter by 2½ inches wide. It rotated at a speed of 21 revolutions per minute. The mixed material had a semiplastic consistency. The mixture was then briquetted in a Komarek-Greaves briquetting machine having rolls 28 inches in diameter by 27 inches wide. The rolls had pockets such that briquets 2⅛ inches wide, 2⅛ inches long by 1⅛ inches thick were formed. The mixture was compacted into well-formed, smooth briquets. The moist briquets were dried at a temperature of 200° F. for 16 hours and their strength was determined by a modified ASTM procedure (D–141). The size stability was 0.46.

The electrical resistance of the briquets measured with an electronic voltmeter with aluminum foil electrodes contacting the face of the briquets was 120 million ohms. The briquets were then calcined and carbonized in an electrically heated furnace for a 60-minute period during which the temperature was increased to about 1400° F. A stream of air was admitted to the calcining chamber during the heating period and combustion on the briquet surfaces was observed. The briquets were allowed to cool in air to room temperature and the interior of the briquets was examined. The carbon had been burned out to a depth of ⅟₁₆ inch leaving an insulating phosphate layer on the outside surface. The interior of the briquets showed a network of carbon that had resulted from the carbonization of the coal. The electrical resistance of the whole briquets after carbonizing was 210 million ohms.

The carbonized briquets were then broken into approximately one-inch pieces and the specific resistance of a batch of these broken briquets was determined. The briquets were broken to simulate breakage that might occur in conveying or handling, when transporting this material to the phosphorus furnace. A nonconducting pipe 6 inches in diameter and 7½ inches long was filled with the broken briquets and the ends of the pipe were fitted with brass end plates which served as electrodes. The specific resistance of these broken briquets was 449 million ohms per centimeter cubed. The specific resistance of a mixture of nodules, coke-coal, and silica, regularly charged to electric phosphorus furnaces was 160 million ohms per centimeter cubed. Comparison of these specific resistance values showed that the briquetted mixture with the insulating layer had ample resistance for satisfactory use in the phosphorus furnaces.

*Example II*

Phosphate and coal were ground to pass a 10-mesh screen and mixed. No silica rock was used in the mixture because the phosphate contained enough $SiO_2$ for phosphate reduction. The phosphate was from the TVA Truett tract in Williamson County, Tennessee. Composition of the phosphate was 21 percent $P_2O_5$, 29 percent $SiO_2$, 28 percent CaO, and 3 percent moisture. The coal composition was the same as that used in Example 1. The mixture comprised 50 pounds of phosphate and 12 pounds of coal; the moisture content of the mixture was adjusted to 21.4 percent by the addition of water. The materials were mixed, briquetted, and dried according to the same procedure used in Example I. The dried briquets had a size stability of 0.50. The electrical resistance across the briquets was 70 million ohms. The briquets were calcined and carbonized in the same manner as for Example I with a stream of air added to promote burning of the outside briquet surface. After carbonizing and cooling, the resistance across a briquet was 860 million ohms. The specific resistance of broken briquets was 334 million ohms per centimeter cubed; this value was somewhat greater than the specific resistance of the charge mixture regularly used in the phosphorus furnaces.

*Example III*

Calcined phosphate (nodules), coke, and silica were proportioned, mixed, coated with hot pitch, and briquetted in a Komarek-Greaves briquet press to form briquets 2⅛ by 2⅛ by 1⅛ inches in size.

The mixing-coating operation was done batchwise in 8-foot diameter Simpson Intensive mixers having two muller wheels 37 inches in diameter and 11 inches thick, carried on a central shaft rotating at 20 revolutions per minute. Mixing was continued for 6 to 8 minutes. The batch weight was 2,174 pounds, made up of 1,585 pounds of nodules, 155 pounds of coke, 260 pounds of silica pebble, and 174 pounds of melted pitch. The nodule particle size was minus 6 mesh plus 12 mesh (or minus ¼ inch plus 12 mesh), the coke was minus ¼ inch plus 12 mesh, and the silica was minus ¼ inch, with very little fine material. The amount of binding pitch added was 8 percent of the weight of solid materials. The mixers were gas heated and the mixed material was released to the press at about 220° to 250° F. The optimum briquetting temperature was about 220° to 250° F.

The electrical resistance of individual briquets before carbonization was 1,500 million ohms. After carbonization at 1800° F. in an atmosphere of nitrogen the resistance of individual briquets was only 0.6 ohm. The briquets were heated at 1800° F. in an oxidizing atmosphere for 30 minutes in order to form an insulating layer on the outside surface. This treatment burned out the surface carbon to a depth of about ⅟₁₀ inch. The electrical resistance of individual briquets was thereby increased to 1,000 million ohms. Briquets broken to a particle size of about 1 inch had a specific resistance value of 645 million ohms per centimeter cubed. This resistance is of a satisfactory high value for use in an electric phosphorus furnace.

On a plant scale, phosphate-carbon-silica agglomerates bonded with pitch or other carbonaceous materials could be processed in a calcining-oxidizing unit similar to that shown in FIGURE 2.

*Example IV*

This example represents the manner in which high electrical resistance briquets would be produced on a large scale. The example given is based on my knowledge of large-scale briquetting, small-scale tests of briquet carbonization, and my knowledge of large-scale grate calcining equipment. The integrated operation has not been carried out as described.

Briquets are produced from a mixture of phosphate matrix and high volatile bituminous coal. The phosphate is a mixture consisting of 57.5 percent Harris matrix and 42.5 percent Truett matrix. These proportions of the phosphates are selected so that the $SiO_2:CaO$ weight ratio in the mixture will be 0.85 and silica rock will not be a component of the mixture. The composition of the phosphate mixture on a dry basis is 23.3 percent $P_2O_5$, 31.2 percent CaO, 26.5 percent $SiO_2$, 4.1 percent $Fe_2O_3$, and 8.7 percent $Al_2O_3$. The coal is crushed so that it is smaller than 10 mesh. Coal comprises 21.2 percent of the coal-phosphate mixture. The amount of coal in the mixture is adequate to permit part of the carbon to be burned out of the briquets with enough carbon remaining to supply a four percent excess of carbon over that required to reduce the $P_2O_5$ and $Fe_2O_3$ in the briquets.

The phosphate and pulverized coal are charged alternately to two intensive mixers in which the moisture content of the mixture is adjusted to 14 percent and each batch is mixed for 6 minutes. The batches of phosphate-coal mixture are discharged to a briquetting machine where the material is subjected to a pressure of 5,000 pounds per square inch and 2⅛ inch by 2⅛ inch by 1⅛ briquets are formed. The phosphate-coal mixture contains enough clay to serve as a binder without the necessity for adding binder to form the briquets.

The briquets formed are charged to the grate calciner shown in FIGURE 2. In the calciner the briquets are calcined, carbonized, and controlled burning is carried out so that the briquets have an electrically insulated outer shell. The grate calciner is 60 feet long and 8 feet wide. Bedding material (recycled product) is placed on the grate to a depth of 6 inches in order to protect the grate. The briquets are placed on the grate 12 inches deep (18 inches total depth). Retention time on the grate is 40 minutes. The production rate is 2.25 tons of calcined briquets per hour per foot of grate width, or 430 tons of calcined briquets per day. The grate enclosure is divided into three chambers by lateral refractory walls. The first chamber, for drying, is 14 feet long; the calcining chamber, 30 feet long; and the cooling chamber, 14 feet long. Hot mixed gases from the calcining and cooling chambers enter the drying chamber at 1000° F., pass down through the briquet and bedding material and are exhausted to atmosphere or to a dust catcher at 400° F.

In the calcining-oxidizing chamber hot gases from the cooling chamber and the calcining-oxidizing chamber exhaust enter the top of the briquet bed at 1200° F. The oxygen content of these gases is controlled by adjusting the proportions of gases from the two sources by means of butterfly control valves in the gas lines. The oxygen content is adjusted to permit combustion of volatile matter expelled from the coal and to burn the solid carbon residue on and near the agglomerate surfaces. Burning the carbon to a depth of about 1⁄16 inch provides the electrically insulating agglomerate surface essential to proper operation of an electric reduction furnace.

The downward flowing gases in the calcining-oxidizing chamber pass through and heat the bedding material. If the amount of heat supplied by burning volatile matter from the coal and surface carbon in the agglomerates is insufficient for calcining requirements (about 1,000,000 B.t.u. per ton of briquets), a burner may be installed to supply additional heat. When using bituminous coal containing about 33 percent volatile matter the calcining operation will normally be self sustaining. Gas temperatures below the grate may range from about 1000° F. at the upstream end to 1600° F. at the downstream end of the calcining-oxidizing chamber. Residual combustibles, if any, are burned below the grate by admitting supplementary air to the enclosure. A portion of the exhaust gases is returned to the calcining-oxidizing chamber to control the oxygen content of the mixed gases entering the briquet bed. An igniter at the upstream end of the chamber starts the burning of volatile matter from the coal. Burning progresses downward as the bed moves through the chamber. Part of the exhaust gases is used in the drying section.

In the cooling chamber air is blown upward through the bed to reduce the briquet temperature at discharge to about 300° F. Discharge air at about 800° F. from the cooler is introduced to the calciner-oxidizer for mixing with exhaust gases from the latter. Part of the heated air from the cooler is used in the drying section. Vents from both the calcining and cooling sections permit flexibility of control.

Calcined briquets from the grate calciner have an electrical resistance of about 300 million ohms and a specific resistance of about 210 million ohms per centimeter cubed when measured in a column of material 6 inches in diameter by 7½ inches long. Size stability of the briquets as determined by modified ASTM procedure D-141 is 0.50. The briquets have a network of carbon interspersed throughout resulting from carbonization of the bituminous coal. The briquets contain calcined phosphate, low cost carbon, and silica flux all included in a single agglomerate. But the briquets have high electrical resistance because of the insulating layer formed on the outside surface. The briquets may be charged to the furnace as produced or they may be crushed to a smaller size.

While I have shown and described particular embodiments of my invention, modifications and variations thereof will occur to those skilled in the art. I wish it to be understood therefore that the appended claims are intended to cover such modifications and variations which are within the true scope and spirit of my invention.

What I claim as new and desire to secure by Letters Patent of the United States is:

1. A process of preparing an agglomerated briquetted charge suitable for winning phosphorus values from phosphate rock in an electric type phosphorus furnace, which process comprises the steps of:
  (1) mixing phosphate rock, coal, and silica to form a charge suitable for winning phosphorus in an electric type phosphorus furnace, said charge containing proportions of said phosphate rock, coal, and silica such that the $SiO_2/CaO$ weight ratio is greater than about 0.85 and that the fixed carbon content therein is about 4 percent in excess of the stoichiometric amount required to reduce the iron and phosphorus values in said charge to the elemental forms thereof;
  (2) forming briquet agglomerates of said charge mixture;
  (3) simultaneously introducing the resulting green briquets of said charge mixture into a calcining unit, together with a stream of air, the quantity of said air admitted to said calcining unit sufficient to oxidize the surface of said briquets to a depth such that the resulting later-mentioned product of said process has a specific resistance greater than about 160 million ohms per centimeter cubed;
  (4) increasing the temperature of the briquets in said calcining unit to about 1600° F.

(5) cooling said briquets; and
(6) collecting as product the resulting calcined carbonized briquets;

said process being characterized by the fact that the carbon in the outer layer of the briquet produced thereby has been removed leaving on said calcined carbonized briquets an electrical insulating skin of calcined phosphate-silicate.

2. A process of preparing an agglomerated briquetted charge suitable for winning phosphorus values from phosphate rock in an electric type phosphorus furnace, which process comprises the steps of:
(1) mixing phosphate rock, coal, and silica to form a charge suitable for winning phosphorus in electric type phosphorus furnace, said charge containing proportions of said phosphate rock, coal, and silica such that the $SiO_2/CaO$ weight ratio is greater than about 0.85 and that the fixed carbon content therein is about 4 percent in excess of the stoichiometric amount required to reduce the iron and phosphorus values in said charge to the elemental forms thereof;
(2) drying said charge mixture to a moisture content of about 12 to about 14 percent;
(3) simultaneously introducing the resulting green briquets of said charge mixture into a calcining unit, together with a stream of air, the quantity of said air admitted to said calcining unit sufficient to oxidize the surface of said briquets to a depth such that the resulting later-mentioned product of said process has a specific resistance greater than about 160 million ohms per centimeter cubed;
(4) increasing the temperature of the briquets in said calcining unit to about 1600° F. during a period of about 30 minutes;
(5) cooling said briquets; and
(6) collecting as product the resulting calcined carbonized briquets;

said process being characterized by the fact that the carbon in the outer layer of the briquet produced thereby has been removed leaving on said calcined carbonized briquets an electrical insulating skin of calcined phosphate-silicate sufficient to impart to the individual briquets an electrical resistance of greater than about 300 million ohms.

3. The process of claim 2 wherein the depth of oxidation of the surface of said briquets is approximately one-sixteenth of an inch.

4. The process of claim 2 wherein the depth of oxidation of the surface of said briquets is approximately one-tenth on an inch.

5. A new composition of matter suitable for charging in an electric type phosphorus furnace which consists essentially of briquetted agglomerates of phosphate rock, silica and carbon so proportioned that the $SiO_2/CaO$ weight ratio therein is greater than about 0.85 and the fixed carbon content therein is about 4 percent in excess of the stoichiometric requirement for subsequently reducing the iron and phosphorus values therein to the elemental form thereof, the interior of said agglomerates comprising a network of said carbon supporting said phosphate rock and silica and the exterior of said agglomerates comprising a highly electrical resistive skin of calcined phosphate-silicate, said skin substantially free of said carbon network in said briquetted agglomerates having an average specific resistance greater than about 160 million ohms per centimeter cubed.

6. The composition of matter of claim 5 wherein said highly electrical resistive skin is in the range of about one-sixteenth to about one-tenth of an inch in thickness.

References Cited
UNITED STATES PATENTS

| | | | |
|---|---|---|---|
| 1,730,521 | 10/1929 | Miner | 23—205 |
| 2,590,436 | 3/1952 | Luten | 23—1 |
| 2,961,411 | 11/1960 | Klugh | 252—188.3 |
| 3,012,970 | 12/1961 | Banks et al. | 252—188.3 |
| 3,056,659 | 10/1962 | Yarze et al. | 23—223 |

LEON D. ROSDOL, *Primary Examiner.*

EDWARD STERN, *Examiner.*

S. D. SCHWARTZ, *Assistant Examiner.*

UNITED STATES PATENT OFFICE
CERTIFICATE OF CORRECTION

Patent No. 3,335,094                              August 8, 1967

Wilbur J. Darby

It is hereby certified that error appears in the above numbered patent requiring correction and that the said Letters Patent should read as corrected below.

Column 9, line 22, after "percent;" insert the following step -- forming briquet agglomerates from said mixture; --.

Signed and sealed this 25th day of June 1968.

(SEAL)
Attest:

Edward M. Fletcher, Jr.
Attesting Officer

EDWARD J. BRENNER
Commissioner of Patents